(12) United States Patent
Cropley et al.

(10) Patent No.: US 6,811,905 B1
(45) Date of Patent: Nov. 2, 2004

(54) DIRECT ORGANIC FUEL CELL HAVING A VAPOR TRANSPORT MEMBER

(75) Inventors: Cecelia C. Cropley, Acton, MA (US); Simon G. Stone, Arlington, MA (US)

(73) Assignee: Giner Electro Chemical Systems, LLC, Newton, MA (US)

(*) Notice: Subject to any disclaimer, the term of this patent is extended or adjusted under 35 U.S.C. 154(b) by 285 days.

(21) Appl. No.: 10/153,065

(22) Filed: May 21, 2002

(51) Int. Cl.[7] .................. H01M 8/00; H01M 8/18; H01M 8/10; H01M 2/00; H01M 2/14

(52) U.S. Cl. .................. 429/13; 429/19; 429/21; 429/30; 429/34; 429/39

(58) Field of Search .................. 429/13, 19, 21, 429/30, 34, 35, 36, 37, 38, 39

(56) References Cited

U.S. PATENT DOCUMENTS

| | | | |
|---|---|---|---|
| 5,523,177 A | 6/1996 | Kosek et al. | 429/40 |
| 5,599,638 A | 2/1997 | Surampudi et al. | 429/33 |
| 5,945,231 A | 8/1999 | Narayanan et al. | 429/30 |
| 5,992,008 A | 11/1999 | Kindler | 29/730 |

FOREIGN PATENT DOCUMENTS

| | | | |
|---|---|---|---|
| JP | 2002-110191 | * | 4/2002 |
| WO | WO99/34467 | | 7/1999 |
| WO | WO00/26980 | | 5/2000 |

* cited by examiner

*Primary Examiner*—Patrick Ryan
*Assistant Examiner*—Thomas H. Parsons
(74) *Attorney, Agent, or Firm*—Kriegsman & Kriegsman

(57) ABSTRACT

A fuel cell and method using the same. The fuel cell comprises a membrane electrode assembly, the membrane electrode assembly comprising a proton exchange membrane having a front face and a rear face. An anode is coupled to the front face of the proton exchange membrane, and a cathode is coupled to the rear face of the proton exchange membrane. A vapor diffusion chamber is positioned in the front of the anode, and a vapor transport member is positioned in front of the vapor diffusion chamber. The vapor transport member is substantially impermeable to an organic fuel/water mixture in a liquid phase but is permeable to the organic fuel/water mixture in a vapor phase. In operation, a liquid fuel mixture delivered to the vapor transport member evaporates from the vapor transport member and is delivered to the anode in vapor form.

37 Claims, 10 Drawing Sheets

DIRECT ORGANIC FUEL CELL HAVING A VAPOR TRANSPORT MEMBER

STATEMENT REGARDING FEDERALLY SPONSORED RESEARCH OR DEVELOPMENT

This invention was made with government support under Grant No. 1R43HL69711-02 awarded by the National Institutes of Health. The Government has certain rights in the invention.

BACKGROUND OF THE INVENTION

The present invention relates generally to fuel cells and relates more particularly to direct organic fuel cells.

Fuel cells are electrochemical cells in which a free energy change resulting from a fuel oxidation reaction is converted into electrical energy. Because of their comparatively high inherent efficiencies and comparatively low emissions, fuel cells are presently receiving considerable attention as a possible alternative to the combustion of nonrenewable fossil fuels in a variety of applications.

A typical fuel cell comprises a fuel electrode (i.e, anode) and an oxidant electrode (i.e., cathode), the two electrodes being separated by an ion-conducting electrolyte. The electrodes are connected electrically to a load, such as an electronic circuit, by an external circuit conductor. Oxidation of the fuel at the anode produces electrons that flow through the external circuit to the cathode producing an electric current. The electrons react with an oxidant at the cathode. In theory, any substance capable of chemical oxidation that can be supplied continuously to the anode can serve as the fuel for the fuel cell, and any material that can be reduced at a sufficient rate at the cathode can serve as the oxidant for the fuel cell.

In one well-known type of fuel cell, sometimes referred to as a hydrogen fuel cell, gaseous hydrogen serves as the fuel, and gaseous oxygen, which is typically supplied from the air, serves as the oxidant. The electrodes in a hydrogen fuel cell are typically porous to permit the gas-electrolyte junction to be as great as possible. At the anode, incoming hydrogen gas ionizes to produce hydrogen ions and electrons. Since the electrolyte is a non-electronic conductor, the electrons flow away from the anode via the external circuit, producing an electric current. At the cathode, oxygen gas reacts with the hydrogen ions migrating through the electrolyte and the incoming electrons from the external circuit to produce water as a byproduct. The overall reaction that takes place in the fuel cell is the sum of the anode and cathode reactions, with part of the free energy of reaction being released directly as electrical energy and with another part of the free energy being released as heat at the fuel cell.

It can be seen that as long as oxygen and hydrogen are fed to a hydrogen fuel cell, the flow of electric current will be sustained by electronic flow in the external circuit and ionic flow in the electrolyte. Oxygen, which is naturally abundant in air, can easily be continuously provided to the fuel cell. Hydrogen, however, is not so readily available and specific measures must be taken to ensure its provision to the fuel cell. One such measure for providing hydrogen to the fuel cell involves storing a supply of hydrogen gas and dispensing the hydrogen gas from the stored supply to the fuel cell as needed. Another such measure involves storing a supply of an organic fuel, such as methanol, and then reforming or processing the organic fuel into hydrogen gas, which is then made available to the fuel cell. However, as can readily be appreciated, the reforming or processing of the organic fuel into hydrogen gas requires special equipment (adding weight and size to the system) and itself requires the expenditure of energy.

Accordingly, in another well-known type of fuel cell, sometimes referred to as a direct organic fuel cell, an organic fuel is itself oxidized at the anode. Examples of such organic fuels include methanol, ethanol, propanol, isopropanol, trimethoxymethane, dimethoxymethane, dimethyl ether, trioxane, formaldehyde, and formic acid. Typically, the electrolyte in such a fuel cell is a solid polymer electrolyte or proton exchange membrane (PEM). (Because of the need for water in PEM fuel cells, the operating temperature for such fuel cells is limited to approximately 130° C.) In operation, the organic fuel is delivered to the anode in the form of a fuel/water mixture, and airborne oxygen is delivered to the cathode. (Oxidants other than oxygen, such as hydrogen peroxide, may also be used.) Protons are formed by oxidation of the organic fuel at the anode and pass through the proton exchange membrane to the cathode. Electrons produced at the anode in the oxidation reaction flow in the external circuit to the cathode, driven by the difference in electric potential between the anode and the cathode and, therefore, can do useful work. A summary of the electrochemical reactions occurring in a direct organic fuel cell (with methanol illustratively shown as the organic fuel) are as follows:

$$\text{Anode: } CH_3OH+H_2O \rightarrow CO_2+6H^++6e^- \quad (1)$$

$$\text{Cathode: } 1.5O_2+6H^++6e^- \rightarrow 3H_2O \quad (2)$$

$$\text{Overall: } CH_3OH+1.5O_2 \rightarrow CO_2+2H_2O \quad (3)$$

At present, there are two different types of systems that incorporate direct organic fuel cells, namely, liquid feed systems and vapor feed systems. Examples of liquid feed systems are disclosed in the following U.S. patents, all of which are incorporated herein by reference: U.S. Pat. No. 5,992,008, inventor Kindler, issued Nov. 30, 1999; U.S. Pat. No. 5,945,231, inventor Narayanan et al., issued Aug. 31, 1999; U.S. Pat. No. 5,599,638, inventors Surampudi et al., issued Feb. 4, 1997; and U.S. Pat. No. 5,523,177, inventors Kosek et al., issued Jun. 4, 1996.

In a typical liquid feed system, a dilute aqueous solution of the organic fuel (i.e., approximately 3–5 wt % or 0.5–1.5 M organic fuel) is delivered to the fuel cell anode whereupon said aqueous solution diffuses to the active catalytic sites of the anode, and the fuel therein is oxidized. The liquid feed system is typically operated at 60° C.–90° C. although operation at higher temperatures is possible by pressurizing the anode and the fuel supply system. (For operation at temperatures greater than 100° C., cathode pressurization is additionally required.)

As can readily be appreciated, it would be desirable to increase fuel cell performance in a liquid feed system by using a more concentrated solution of the organic fuel than the approximately 3–5 wt % solution described above. Unfortunately, however, the proton exchange membrane typically used in a liquid feed system is rather permeable to the organic fuel. As a result, a substantial portion of the organic fuel delivered to the anode has a tendency to permeate through the proton exchange membrane, instead of being oxidized at the anode. Moreover, much of the fuel that transits the proton exchange membrane is chemically reacted at the cathode and, therefore, cannot be collected and recirculated to the anode. This type of fuel loss, which can total as much as 50% of the fuel, is referred to in the art as crossover. In addition, this problem of cross-over is exacerbated if the concentration of organic fuel in the aqueous solution is increased beyond the approximately 3–5 wt % described above since the permeability of the proton exchange membrane increases exponentially as the organic fuel concentration increases.

Consequently, because the concentration of organic fuel in the aqueous solution must remain relatively low to minimize cross-over, large quantities of water must be made available for diluting the organic fuel to appropriate levels. However, as can be appreciated, the required quantities of water can be heavy and space-consuming and can pose a problem to the portability of the system. Moreover, equipment for mixing the water and the organic fuel in the appropriate amounts, for re-circulating water generated at the cathode and for monitoring the concentration of the organic fuel in the aqueous solution is often needed as well.

Another complication resulting from the high concentration of water present in the aqueous solution is that a considerable amount of water delivered to the anode also permeates through the proton exchange membrane to the cathode. This excess water arriving at the cathode limits the accessibility of the cathode to gaseous oxygen, which must be reduced at the cathode to complement the oxidation of the fuel at the anode. This phenomenon of the permeating water accumulating at the cathode and, thereby, limiting the accessibility of the cathode to gaseous oxygen is referred to in the art as flooding. As can readily be appreciated, flooding adversely affects fuel cell performance.

In a typical vapor feed system, the aqueous solution of organic fuel and water is vaporized prior to entering the fuel cell and is then fed, in vapor form, to the anode. Because the proton exchange membrane is less permeable to the fuel/water mixture in vapor form than it is to the fuel/water mixture in liquid form, the above-described problems of cross-over and flooding are less pronounced in a vapor feed system. As a result, fuel cell performance and fuel efficiency are typically greater in a vapor feed system than in a liquid feed system. Moreover, due to the decreased permeability of the membrane to the fuel/water mixture in its vapor form, a higher concentration of the organic fuel may be employed in a vapor feed system.

However, some of the advantages of a typical vapor feed system are that the system must be operated at above 100° C. in order to prevent condensation of the fuel/water mixture at the anode. In addition, the fuel/water mixture must be vaporized prior to entering the fuel cell. As can be appreciated, the foregoing conditions require the use of specialized equipment that is space-consuming and that requires the expenditure of energy for its own operation. Moreover, due to the amount of heat that is generated as an unwanted byproduct in the fuel cell, a vapor feed system must also include a cooling assembly, typically in the form of coolant plates and a circulating coolant, to keep the fuel cell from getting too hot. Such a cooling assembly can add considerable weight and volume to the system, especially if a multi-cell stack is used, since one cooling plate is needed for every 2–5 active cells. (By contrast, in a liquid feed system, the aqueous solution, in addition to containing the fuel, also serves as a coolant for the system.)

SUMMARY OF THE INVENTION

It is an object of the present invention to provide a novel direct organic fuel cell.

It is another object of the present invention to provide a novel direct organic fuel cell that. overcomes at least some of the drawbacks discussed above in connection with existing direct organic fuel cells.

Therefore, according to one aspect of the invention, there is provided a fuel cell suitable for use as a direct organic fuel cell, said fuel cell comprising (a) a membrane electrode assembly, said membrane electrode assembly comprising (i) a proton exchange membrane, said proton exchange membrane having a front face and a rear face, (ii) an anode, said anode coupled to said front face of said proton exchange membrane, and (iii) a cathode, said cathode coupled to said rear face of said proton exchange membrane; (b) a vapor diffusion chamber, said vapor diffusion chamber being positioned in front of said anode; (c) a vapor transport member positioned in front of said vapor diffusion chamber, said vapor transport member being substantially impermeable to an organic fuel and water mixture in a liquid phase but being permeable to said organic fuel and water mixture in a vapor phase; and (d) means for electrically interconnecting said anode and said cathode through an external load.

More specifically, in a first preferred embodiment, the aforementioned fuel cell comprises (a) a membrane electrode assembly, said membrane electrode assembly comprising (i) a proton exchange membrane, said proton exchange membrane having a front face and a rear face, (ii) an anode, said anode coupled to said front face of said proton exchange membrane and preferably including a platinum-ruthenium electrocatalytic film and (iii) a cathode, said cathode coupled to said rear face of said proton exchange membrane and preferably including a platinum electrocatalytic film. An electrically-conductive, vapor-permeable member, which may be, for example, a metal screen package, is positioned in front of and in contact with said anode, said electrically-conductive, vapor-permeable member defining a vapor diffusion chamber and serving as the negative terminal of the fuel cell. A vapor transport member, which may be, for example, a perfluorosulfonic acid membrane, is positioned in front of and in contact with said electrically-conductive, vapor-permeable member, said vapor transport member being substantially impermeable to an organic fuel and water mixture in a liquid phase but being permeable to said organic fuel and water mixture in a vapor phase. A support that is porous to liquid, which support may be, for example, carbon fiber paper, is positioned in front of and in contact with said vapor transport member, said vapor transport member extending beyond the periphery of said support. A fuel distribution plate is positioned in front of and in contact with both the support and the periphery of the vapor transport member, the support being seated upon a recessed shelf formed within a cavity of the fuel distribution plate, the cavity facing towards said vapor transport member and being adapted to hold a quantity of a liquid fuel. The fuel distribution plate is additionally shaped to include an array of pillars or like supportive members dispersed throughout the cavity, said supportive members serving both to distribute the fuel throughout the cavity and to provide structural support to the support and the vapor transport member. An oxidant distribution plate, which is electrically conductive and is positioned behind and in contact with said membrane electrode assembly, has a cavity facing said cathode, said cavity being adapted to hold a quantity of an oxidant. The oxidant distribution plate is additionally shaped to include an array of electrically-conductive pillars or like supportive members dispersed throughout the cavity, said electrically-conductive supportive members serving to provide support to the membrane electrode assembly, to distribute the oxidant throughout the cavity and to provide electrical contact between the cathode and the remainder of the plate. A first endplate is positioned in front of and in contact with said fuel distribution plate and a second endplate is positioned behind and in contact with said oxidant distribution plate, said first and second endplates serving to apply axially compressive force to the components located therebetween. In addition, said second endplate serves as a positive terminal and is electrically connected, by way of said oxidant distribution plate, to said cathode.

In a second preferred embodiment, there is provided a co-planar direct organic fuel cell assembly, said co-planar direct organic fuel cell assembly comprising a plurality of co-planar fuel cells and means for coupling together adjacent fuel cells. Each of said co-planar fuel cells comprises a membrane electrode assembly, said membrane electrode assembly comprising (a) a proton exchange membrane, said proton exchange membrane having a top face and a bottom face, (b) an anode, said anode coupled to said bottom face of said proton exchange membrane, and (c) a cathode, said cathode coupled to said top face of said proton exchange membrane. An anode current collector, which is electrically-conductive and vapor-permeable, is positioned below and in contact with said anode, said anode current collector defining a vapor diffusion chamber. A vapor transport assembly, comprising a vapor transport member sandwiched between a pair of porous supports, is positioned below and in contact with said anode current collector, said vapor transport member being substantially impermeable to an organic fuel and water mixture in a liquid phase but being permeable to said organic fuel and water mixture in a vapor phase. An anode basin is positioned below and in contact with said vapor transport assembly, said anode basin having a cavity facing towards said vapor transport member, said cavity being adapted to hold a quantity of a liquid fuel. A cathode current collector is positioned over and in contact with said cathode, said cathode current collector being electrically coupled to said anode current collector through an external load or adapted to be electrically coupled to the anode current collector of an adjacent fuel cell.

The present invention is also directed to a system including one or more direct organic fuel cells of the present invention and means for supplying said one or more direct organic fuel cells with said organic fuel/water mixture.

The present invention is further directed to a method of generating electricity using the direct organic fuel cell of the present invention, as well as to a method of generating hydrogen-containing species, including hydrogen gas, using the direct organic fuel cell of the present invention.

As can be seen, a system comprising the direct organic fuel cell of the present invention possesses certain advantages of the conventional liquid feed system, such as relative system simplicity, while, at the same time, possessing certain advantages of the conventional vapor feed system, such as improved performance and reduced fuel cross-over. In short, such a system is characterized by high performance, high fuel efficiency, high gravimetric and volumetric power densities and ease of operation.

As can readily be appreciated, the direct organic fuel cell of the present invention can be operated conventionally (in the case of a direct methanol fuel cell, to generate carbon dioxide, water and electricity using methanol and gaseous oxygen from air or other oxygen-containing sources) or can be used, in a first alternative application, to generate gaseous hydrogen by additionally supplying electricity to the cell and preventing oxygen from reaching the cathode or, in a second alternative application, to generate a hydrogen-containing species at the cathode by additionally supplying electricity to the cell while providing a reducible species to the cathode. For purposes of the present specification and claims, all references herein to the direct organic fuel cell of the present invention are intended to encompass said fuel cell both in its conventional operation and in the above-described alternative operations to produce hydrogen or a hydrogen-containing species unless otherwise specified or apparent from context.

For purposes of the present specification and claims, it is to be understood that certain terms used herein, such as "on," "over," and "in front of," when used to denote the relative positions of two or more components of a fuel cell, are used to denote such relative positions in a particular orientation and that, in a different orientation, the relationship of said components may be reversed or otherwise altered.

Additional objects, as well as features and advantages, of the present invention will be set forth inpart in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
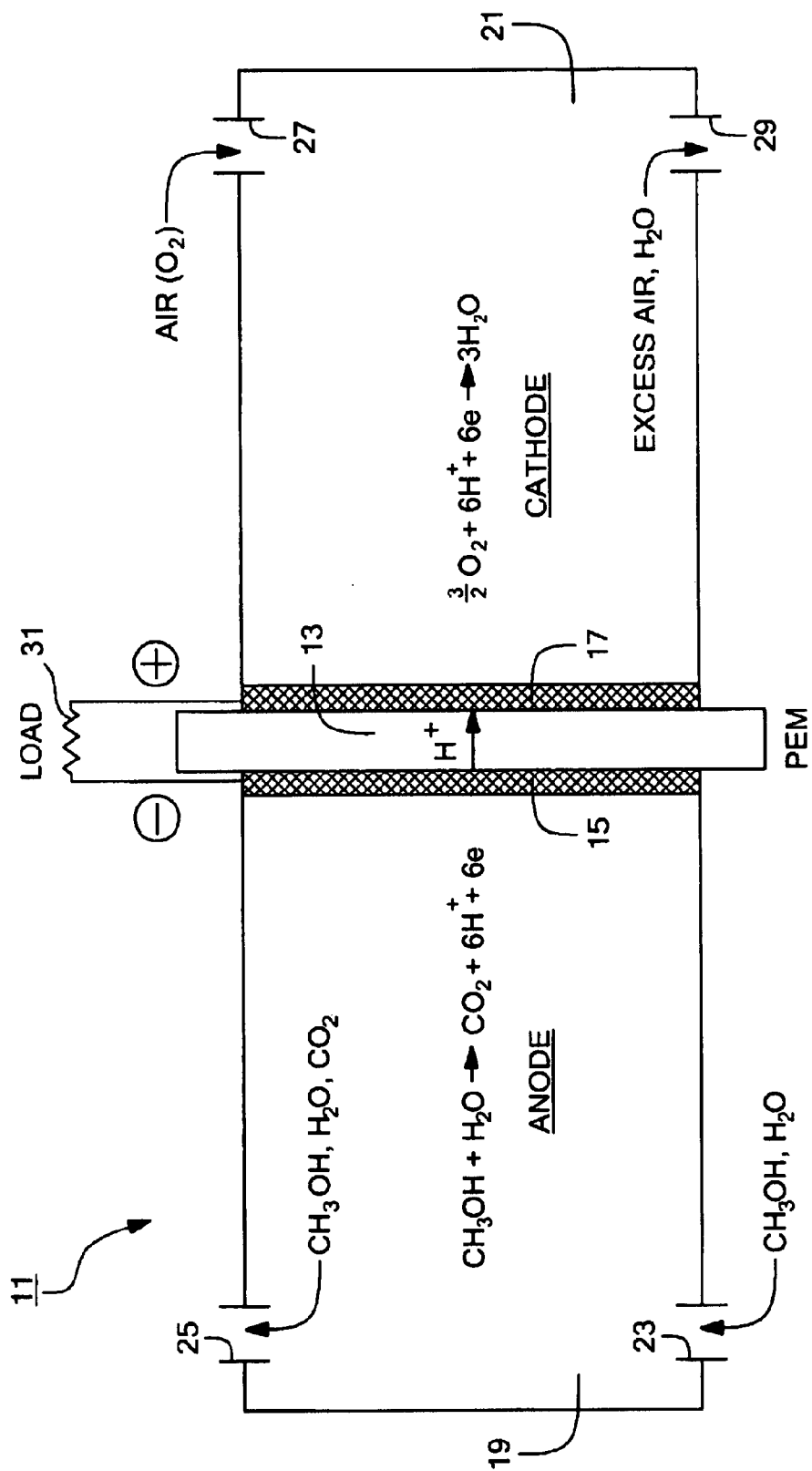
FIG. 1 is a simplified schematic view of a conventional direct methanol fuel cell, illustrating its operation.

Referring now to FIG. 1, there is shown a simplified schematic view of a conventional direct methanol fuel cell, said conventional direct methanol fuel cell being represented generally by reference numeral 11.

Conventional direct methanol fuel cell 11, which may be incorporated into either a conventional liquid feed system or a conventional vapor feed system, comprises a proton exchange membrane 13, an anode 15 positioned against one face of proton exchange membrane 13, and a cathode 17 positioned against the opposite face of proton exchange membrane 13. Proton exchange membrane 13 is typically a Nafion® membrane, a co-polymer membrane made of tetrafluoroethylene and perfluorovinylether sulfonic acid that is commercially available from DuPont (Wilmington, Del.). Anode 15 includes a platinum/ruthenium electrocatalytic film (not shown) positioned at its interface with proton exchange membrane 13 for promoting oxidation of the methanol fuel. Cathode 17 includes a platinum electrocatalytic film (not shown) positioned at its interface with proton exchange membrane 13 for promoting reduction of the oxidant.

Proton exchange membrane 13, anode 15 and cathode 17 together form a single multi-layer composite structure, which is referred to herein as a membrane electrode assembly.

Fuel cell 11 additionally includes an anode chamber 19 adapted for fluid communication with anode 15 and a cathode chamber 21 adapted for fluid communication with cathode 17. Anode chamber 19 is provided with an input port 23 for receiving a mixture of methanol and water and is additionally provided with an output port 25 for discharging methanol, water and carbon dioxide. Cathode chamber 21 is provided with an input port 27 for admitting gaseous oxygen (or air) and is additionally provided with an output port 29 for releasing excess oxygen (or air) and water.

Fuel cell 11 further includes an external electrical load 31 connected between anode 15 and cathode 17.

During operation, a mixture of methanol and water is admitted into anode chamber 19 through input port 23 and is circulated over anode 15. The circulation of the methanol/water mixture over anode 15 causes electrons to be released in the following electrochemical reaction:

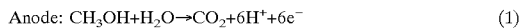

$$\text{Anode: } CH_3OH + H_2O \rightarrow CO_2 + 6H^+ + 6e^- \quad (1)$$

Carbon dioxide produced by the above reaction is then discharged from anode chamber 19, together with any excess methanol/water mixture, through output port 25. (The carbon dioxide is then typically separated from the methanol/water mixture, and the methanol/water mixture is then typically recirculated to input port 23 using a pump.)

At the same time the electrochemical reaction described in equation (1) above is occurring, gaseous oxygen (or air) is admitted into cathode chamber 21 through input port 27 and is circulated over cathode 17. The circulation of oxygen over cathode 17 causes electrons to be captured in the following electrochemical reaction:

$$\text{Cathode: } 1.5O_2 + 6H^+ + 6e^- \rightarrow 3H_2O \quad (2)$$

Excess oxygen (or air) and water are then discharged from cathode chamber 21 through output port 29. (The water may be recovered from the effluent air steam by a water/gas separator and/or by a condensor.) The individual electrode reactions described by equations (1) and (2) result in the following overall reaction for fuel cell 11, with a concomitant flow of electrons:

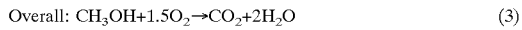

$$\text{Overall: } CH_3OH + 1.5O_2 \rightarrow CO_2 + 2H_2O \quad (3)$$

Figure 2:
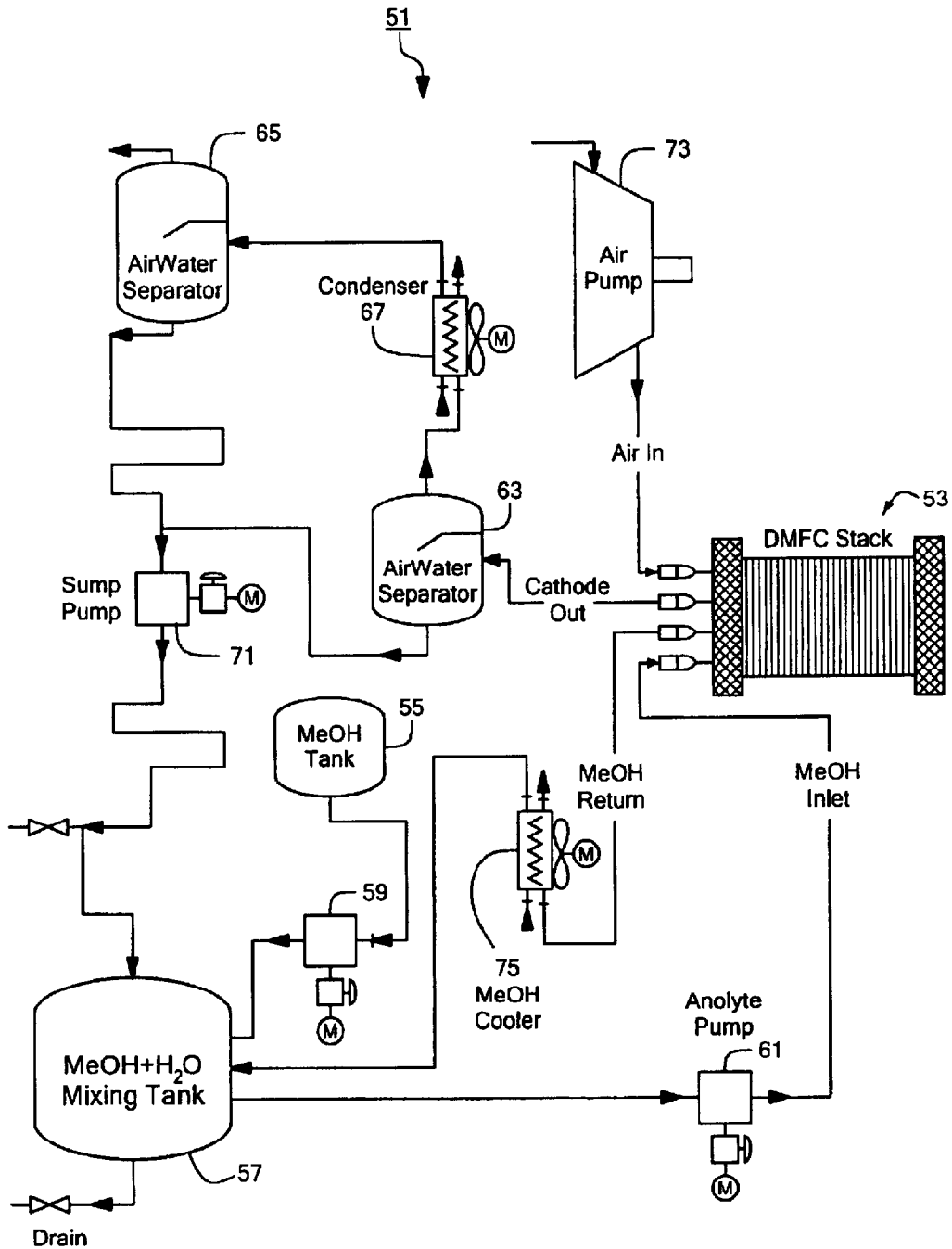
FIG. 2 is a schematic view of a conventional liquid feed system employing a stack of direct methanol fuel cells.

As can readily be appreciated, many practical applications of direct methanol fuel cells (DMFCs) require the collective output of a plurality of such cells. Referring now to FIG. 2, there is shown a conventional liquid feed system employing a stack of direct methanol fuel cells, said conventional liquid feed system being represented generally by reference numeral 51.

As can be seen system 51 is rather complex, system 51 comprising, among other things, a stack 53 of direct methanol fuel cells, a methanol tank 55 for storing pure methanol, a methanol/water mixing tank 57 for mixing and storing methanol and water, a methanol feed pump 59 for feeding methanol from methanol tank 55 to mixing tank 57, a solution circulation pump 61 for feeding the methanol/water solution to stack 53, a plurality of water/gas separators 63 and 65, a condenser 67, a sump pump 71 for returning water to the mixing tank 57, a fan 73 for feeding air into stack 53, and a methanol/water cooler 75 for cooling the methanol/water mixture being returned to mixing tank 57 from stack 53.

Liquid feed system 51 suffers from the many shortcomings discussed above.

Figure 3:
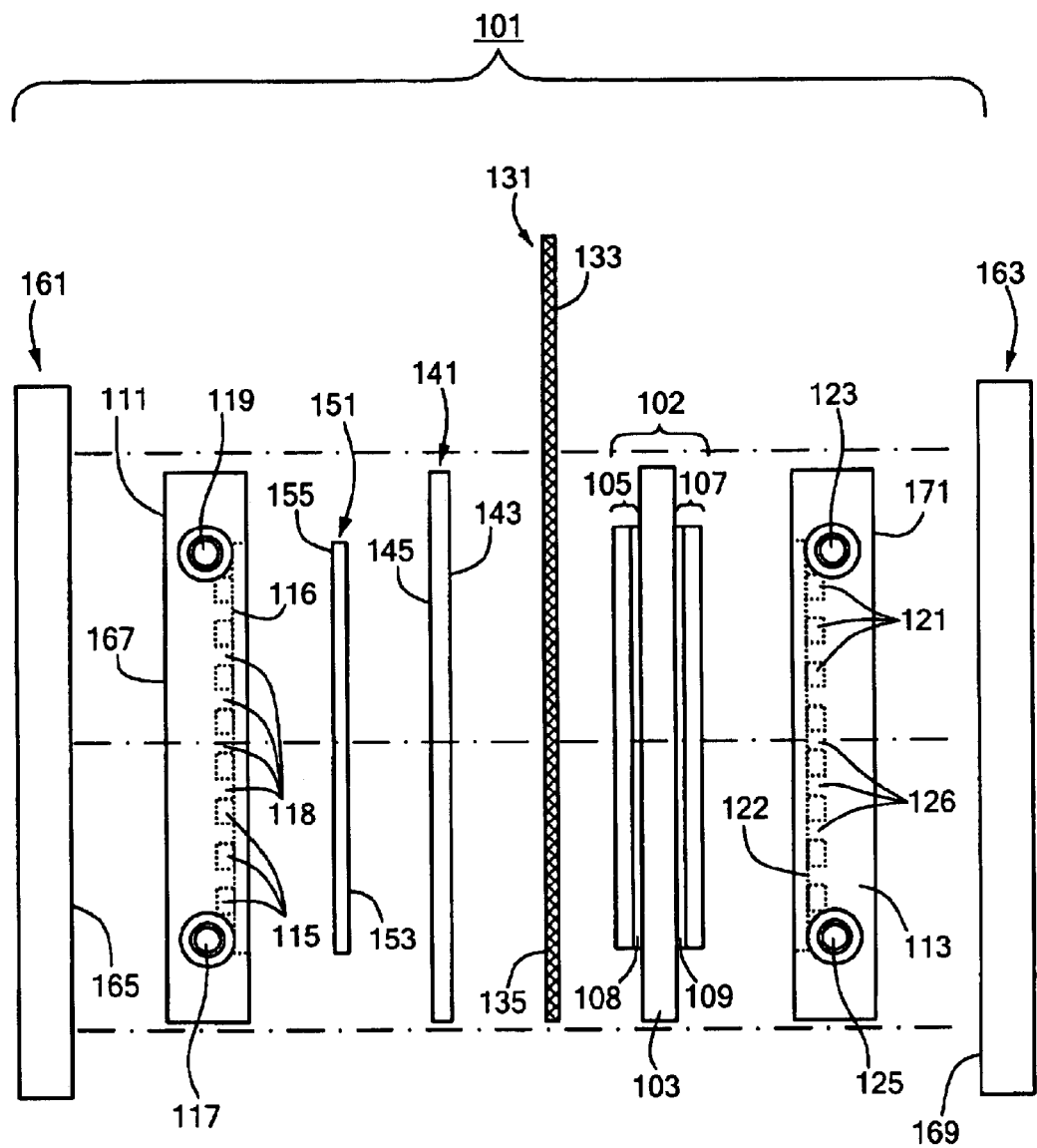
FIG. 3 is an exploded schematic side view of a first embodiment of a direct organic fuel cell constructed according to the teachings of the present invention.

Referring now to FIG. 3, there is shown an exploded side view of a first embodiment of a direct organic fuel cell constructed according to the teachings of the present invention, said direct organic fuel cell being represented generally by reference numeral 101.

Fuel cell 101 is particularly well-suited for use with methanol as its organic fuel, but is not limited thereto, and can alternatively use ethanol, propanol, isopropanol, trimethoxymethane, dimethoxymethane, dimethyl ether, trioxane, formaldehyde, formic acid or the like as its organic fuel. Nevertheless, for ease of discussion, methanol is illustratively referred to herein as the organic fuel for cell 101.

Fuel cell 101 comprises a membrane electrode assembly 102, membrane electrode assembly 102 in turn comprising a proton exchange membrane 103, an anode 105 bonded to one face of proton exchange membrane 103, and a cathode 107 bonded to the opposite face of proton exchange membrane 103. Proton exchange membrane 103 is preferably a Nafion® membrane or like material. Anode 105 preferably includes a platinum/ruthenium electrocatalytic film 108 positioned at its interface with proton exchange membrane 103 for promoting oxidation of the methanol fuel, and cathode 107 preferably includes a platinum electrocatalytic film 109 positioned at its interface with proton exchange membrane 103 for promoting reduction of the oxidant. Notwithstanding the specific electrocatalysts specified above, any suitable oxidation and reduction electrocatalysts may be used. For example, instead of a platinum/ruthenium oxidation electrocatalyst, one may use as the oxidation electrocatalyst (i) the combination of platinum and any other one or more metals from Groups IIIA, IVA, VA, IB, IIB, IIIB, IVB, VB, VIB, VIIB, and VIIIB of the periodic table; (ii) metal oxides of said combination including reduced metal oxides of said combination; or (iii) mixtures and/or alloys thereof. Instead of a platinum reduction electrocatalyst, one may use as the reduction electrocatalyst metal oxides of platinum, including reduced metal oxides of platinum, or mixtures and/or alloys thereof. The oxidation or reduction electrocatalyst may be applied directly to the remainder of its respective electrode or may be dispersed on a suitable catalyst support, such as a carbon, graphite or other electrically conductive support, that is in turn applied directly to the remainder of its respective electrode. Other reduction electrocatalysts known to those skilled in the art, such as sodium platinate, tungsten bronzes, lead ruthenium oxides, lead iridium oxides, lanthanum oxide and macrocyclic or porphyrin structures containing one or more metals, could also be used.

Fuel cell 101 also comprises a pair of fluid distribution plates 111 and 113, plates 111 and 113 being positioned on opposite sides of membrane electrode assembly 102. Plate 111, which serves as a fuel distribution plate, is shaped to include a fluid cavity 115 (shown in phantom using dotted lines) facing towards anode 105. As will be discussed further below, cavity 115 is designed to hold a quantity of an aqueous methanol solution. A recessed shelf 116 (shown in phantom using dotted lines), the purpose of which will become apparent below, is formed along the periphery of cavity 115. An array of supports 118 (shown in phantom using dotted lines) are formed in cavity 115 and extend outwardly in the direction of anode 105 until flush with shelf 116, supports 118 serving to distribute fuel throughout cavity 115 and to provide support to a member yet to be described seated on shelf 116. An input port 117 and an output port 119 are provided in plate 111, ports 117 and 119 being in fluid communication with cavity 115 so that the aqueous methanol solution can be provided to cavity 115 through port 117 and so that carbon dioxide and excess methanol solution can be withdrawn from cavity 115 through port 119. (As can readily be appreciated, in another embodiment (not shown), cavity 115 is not replenished with additional aqueous methanol solution conducted through port 117, but rather, is allotted a predetermined quantity of solution.)

Plate 113 is shaped to include a cavity 121 (shown in phantom using dotted lines), cavity 121 having an open end facing towards cathode 107 that is bounded by a peripherally-extending, recessed shelf 122 (shown in phantom using dotted lines). Shelf 122 is appropriately dimensioned so that, when cathode 107 is seated therein, PEM 103 lies flush against plate 113. (Although not shown, a piece of carbon fiber paper or the like may be bonded to the outer end of cathode 107, said carbon fiber paper being seated directly on shelf 122 to provide support to assembly 102 and to help convey current to plate 113.) As will be discussed further below, cavity 121 is designed for passage of a quantity of gaseous oxygen (or air). An input port 123 (shown in phantom using dotted lines) and an output port 125 (shown in phantom using dotted lines) are provided in plate 113, ports 123 and 125 being in fluid communication with cavity 121 so that oxygen (or air) can be conducted to cavity 121 through port 123 and so that water and excess oxygen (or air) can be withdrawn from cavity 121 through port 125. An array of supports 126 (shown in phantom using dotted lines) are positioned in cavity 121 and extend outwardly in the direction of cathode 107 until flush with shelf 122, supports 126 serving to distribute the oxygen (or air) throughout cavity 121 and to provide support to cathode 107. In addition, because supports 126 (as well as the remainder of plate 113) are electrically conductive and are in electrical contact with cathode 107, supports 126 also serve to conduct electricity from cathode 107.

Fuel cell 101 additionally comprises an electrically-conductive, vapor-permeable member 131, member 131 defining a vapor diffusion chamber whose purpose will be described below. Member 131 is positioned between plate 111 and anode 105, with a first face 133 of member 131 abutting and in electrical contact with anode 105 and with a second face 135 of member 131 spaced apart from plate 111. (Although not shown, gaskets are preferably positioned between and in contact with member 131 and PEM 103 around the periphery of anode 105 to prevent the leakage of vapor from member 131. Alternatively, anode 105 may be positioned within a recessed portion of member 131 to permit member 131 and PEM 103 to lie flush against one another.) Examples of materials suitable for use as member 131 include, but are not limited to, a metallic screen package; a porous metal or carbon foam, paper or felt; and a perforated metal or carbon plate. Additional information regarding some of the materials described above for use as member 131 may be found in commonly-assigned, presently-pending U.S. patent application Ser. No. 09/827,368 now U.S. Pat. No. 6,500,319, which is incorporated herein by reference.

In addition to defining the vapor diffusion chamber referred to above, member 131 additionally serves as a negative terminal for the electric current generated by cell 101.

Fuel cell 101 further comprises a vapor transport member 141, vapor transport member 141 being positioned between plate 111 and member 131, with a first face 143 of member 141 abutting second face 135 of member 131 and a second face 145 of member 141 abutting plate 111 around their respective peripheries. As will be described further below, the function of vapor transport member 141 is to transform the liquid fuel solution into a vapor by having the liquid solution wet member 141 and then evaporate therefrom into the vapor diffusion chamber formed by member 131. In view of the above, vapor transport member 141 may be any material that is permeable to organic fuel vapor and water vapor but that does not allow a significant amount of liquid through its structure. Accordingly, vapor transport member 141 may be made of any of a large number of polymeric materials, particularly those classes of polymers referred to in the art as pervaporation membranes, permselective membranes or ionomeric membranes. For example, anion-exchange membranes, such as those sold by Asahi Glass (Japan), could be used as vapor transport member 141. Other ionomeric membranes include those used in reverse osmosis and ultrafiltration, such as cellulosic, polyamide or polybenzimidazole membranes. Non-polymeric materials commonly used as diaphragms or separators, such as certain ceramic materials and ceramics blended with polymers, are also suitable for use as vapor transport member 141.

Preferably, vapor transport member 141 is a cation-exchange membrane, such as a perfluorosulfonic acid membrane of the type sold by DuPont under the Nafion® trademark. For high vapor transport rates, the most desirable Nafion® membranes are thin and have an equivalent weight of 1100 or lower. Particularly preferred membranes include Nafion® 112 and Nafion® 105, which have dry thicknesses of 0.002 inch (2 mil) and 0.005 inch (5 mil), respectively.

Vapor transport member 141 may take any of a number of different configurations. Examples of suitable configurations include, but are not limited to, plate and frame; spiral wound; tubular; hollow fiber; and other designs typically used in electrochemical cells and transport processes.

As can readily be appreciated, the vapor diffusion chamber defined by vapor-permeable member 131 in the present embodiment could be enlarged by the addition of one or more spacer frames positioned between vapor-permeable member 131 and vapor transport member 141. Alternatively, said one or more spacer frames could be incorporated into member 131 (on side 135) and/or member 141 (on side 143).

Fuel cell 101 additionally comprises a porous support 151, porous support 151 being disposed between plate 111 and vapor transport member 141, with a first face 153 of support 151 abutting second face 145 of member 141 and lying flush with plate 111 and with a second face 155 of support 151 being seated on shelf 116. Porous support 151 serves to provide structural support to member 141. In some cell designs or applications where additional mechanical durability is required, vapor transport member 141 may also contain an internal cloth or support structure.

Fuel cell 101 further comprises a pair of endplates 161 and 163, endplate 161 having a first face 165 abutting the outside face 167 of plate 111, endplate 163 having a first face 169 abutting the outside face 171 of plate 113. Endplates 161 and 163 serve to apply axially compressive force to the above-described components of fuel cell 101. In addition, endplate 163 is electrically conductive and serves as a positive terminal for the electric current generated by cell 101 and, therefore, is electrically connected to vapor-permeable member 131 through an external electric load (not shown).

In operation, the aqueous methanol solution is delivered to cavity 115 of plate 111 through port 117 and, thereafter, passes through porous support 151 where it wets face 145 of vapor transport member 141. Said solution then evaporates from vapor transport member 141 and diffuses through the vapor diffusion chamber of vapor-permeable member 131 to anode 105 of membrane electrode assembly 102, where the oxidation of the fuel vapor occurs to form carbon dioxide (or other species), protons and electrons. Carbon dioxide and any excess fuel then diffuse back from membrane electrode assembly 102 through vapor-permeable member 131, vapor transport member 141, and porous support 151 to plate 111 and exit via port 119. (Although not provided in the present embodiment, openings may be provided in vapor permeable member 131 to allow carbon dioxide to escape from the cell, said openings being appropriately positioned within member 131 so as to minimize loss of fuel vapor.) The electrons generated at anode 105 flow through an external circuit to cathode 107, producing an electrical current. The protons generated at anode 105 migrate across the proton exchange membrane 103 to cathode 107 where they react with the electrons conducted by plate 113 and oxygen (or air) that has diffused to cathode 107 after having been admitted into cavity 121 of plate 113 through port 123. Water present at the cathode 107 and any excess oxygen (or air) are then conducted back to cavity 121 of plate 113 and are discharged through port 125. Cooling of cell 101 is provided by the circulation of the liquid fuel mixture through plate 111.

As can readily be appreciated, a system comprising fuel cell 101 overcomes many of the shortcomings associated with conventional liquid feed and conventional vapor feed systems. More specifically, as compared to conventional liquid feed systems, a system comprising fuel cell 101 does not involve having a liquid fuel mixture come into direct contact with the anode and thereby avoids the high rates of cross-over and flooding typically experienced in conventional liquid feed systems (hence, an increase in fuel efficiency). Moreover, because proton exchange membranes are typically less permeable to vapor fuel mixtures than to liquid fuel mixtures, a system comprising fuel cell 101 is able to accommodate fuel mixtures having a greater methanol concentration than is the case in a conventional liquid feed system (5–7 M methanol vs. 0.5–1.5 M methanol). This increase in methanol concentration leads to an increase in fuel cell performance and to a lower system volume and weight.

As compared to vapor feed systems, a system comprising fuel cell 101 does not require the use of equipment for heating the fuel mixture to a vapor state, the use of equipment for heating and pressurizing the fuel cell or the use of special cooling equipment.

As noted above, only fuel vapor and water vapor permeate through vapor transport member 141 to anode 105. The rate of fuel and water vapor transport to the vapor diffusion chamber and the concentration of these species in the vapor diffusion chamber are dependent on a number of factors, which may be tailored for specific applications. Such factors include the following: (1) the permeability of the transport member; (2) the system operating temperature; (3) the concentration of the contacting organic fuel solution; and (4) the rate at which organic fuel and water are being consumed, i.e., the fuel cell operating current. To maximize fuel efficiency and to minimize cross-over, the fuel cell operating conditions should be selected to provide organic fuel and water as needed for the electrochemical reaction. In this mode of operation, the fuel vapor will be consumed as it is produced, allowing very little fuel to permeate into and across the proton exchange membrane. Also, since vapor, rather than liquid water, is present in the vapor diffusion chamber, the net water drag to the cathode will be substantially lower than in a liquid system.

As can readily be appreciated, by additionally making vapor transport member 141, frames and 113, and porous support 151 electrically-conductive, one can stack a plurality of fuel cell units between endplates 161 and 163 in a bipolar series configuration. (Such a stack would further include a positive and negative buss.) Examples of materials which may be used to form an electrically-conductive, vapor transport member 141 include a Nafion® or like membrane through which strands of a metal, carbon, or other electrically-conductive material have been woven and sealed to prevent liquid leakage; a Nafion® or like membrane through which pins or rods of an electrically-conductive material have been inserted; and a carbon or metallic paper, foam, sinter or similar construction which has been impregnated with a solubilized Nafion® or like material. Porous support 151, to be electrically-conductive, could be made of carbon fiber paper or the like.

Another fuel cell configuration into which the vapor transport member of the present invention may be incorporated is a co-planar fuel cell (also known as a strip or segmented fuel cell), wherein several series-connected cells are fabricated on the same strip or sheet of membrane. Such fuel cells are typically used for low power applications and operate at relatively low temperatures, generally below 60° C. Examples of typical co-planar fuel cells are disclosed in WO 99/34467 and WO 00/26980, both of which are incorporated herein by reference. In a typical co-planar fuel cell, several anodes are bonded to one side of a sheet of membrane electrolyte and are exposed to a common anode feed chamber. Similarly, an equal number of cathodes are bonded to the opposite side of the membrane directly opposite the anodes. (Alternatively, separate pieces of membrane electrolyte, together with an anode on one side thereof and a cathode on the opposite side thereof, may be used for each cell.) The cathodes are exposed to the air, and air flow is achieved by natural convection or by use of a low pressure fan, blower or pump. Edge current collection and wires or cell interconnects are used to connect the individual cells in electrical series. Alternatively, cells or groups of cells may be connected in parallel.

Figure 4A:
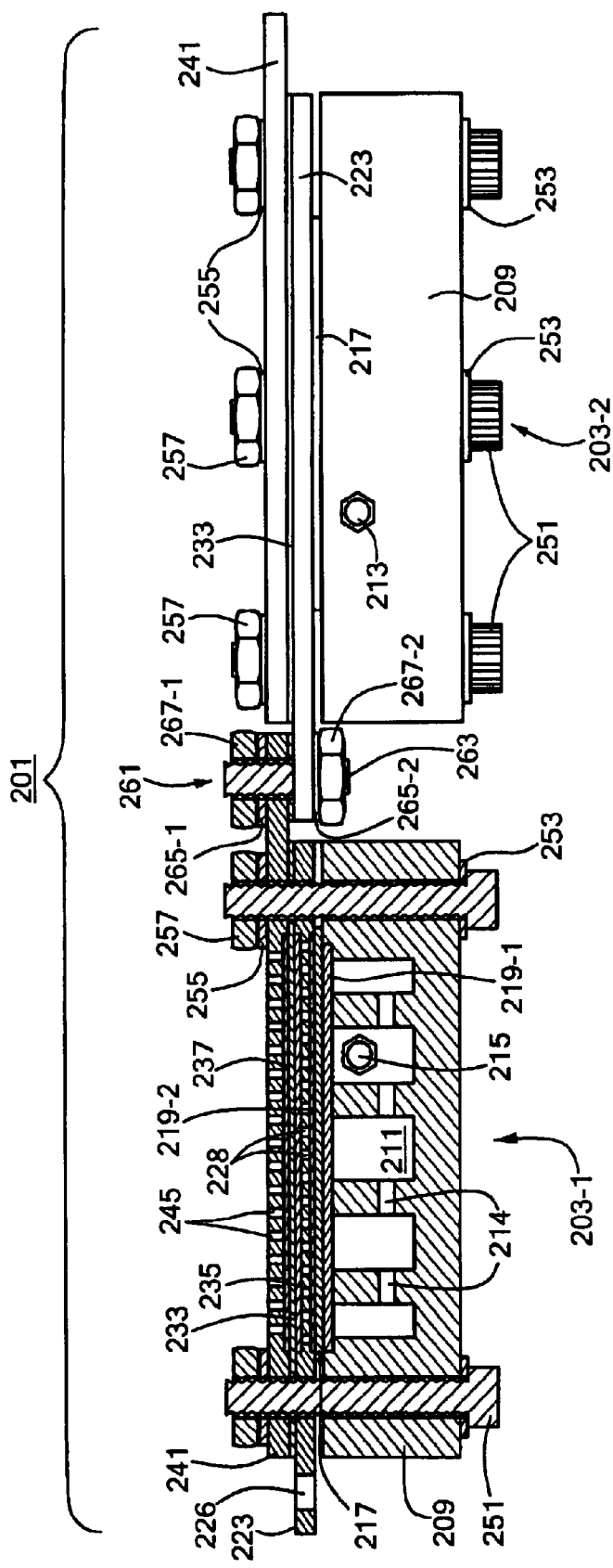
FIG. 4(a) is a front view, shown partly in section, of a first embodiment of a two-cell, co-planar direct organic fuel cell assembly constructed according to the teachings of the present invention.

Referring now to FIG. 4(a), there is shown a front view, partly in section, of one embodiment of a two-cell; co-planar direct organic fuel cell assembly constructed according to the teachings of the present invention, said co-planar direct organic fuel cell assembly being represented generally by reference numeral 201.

Figure 4B:
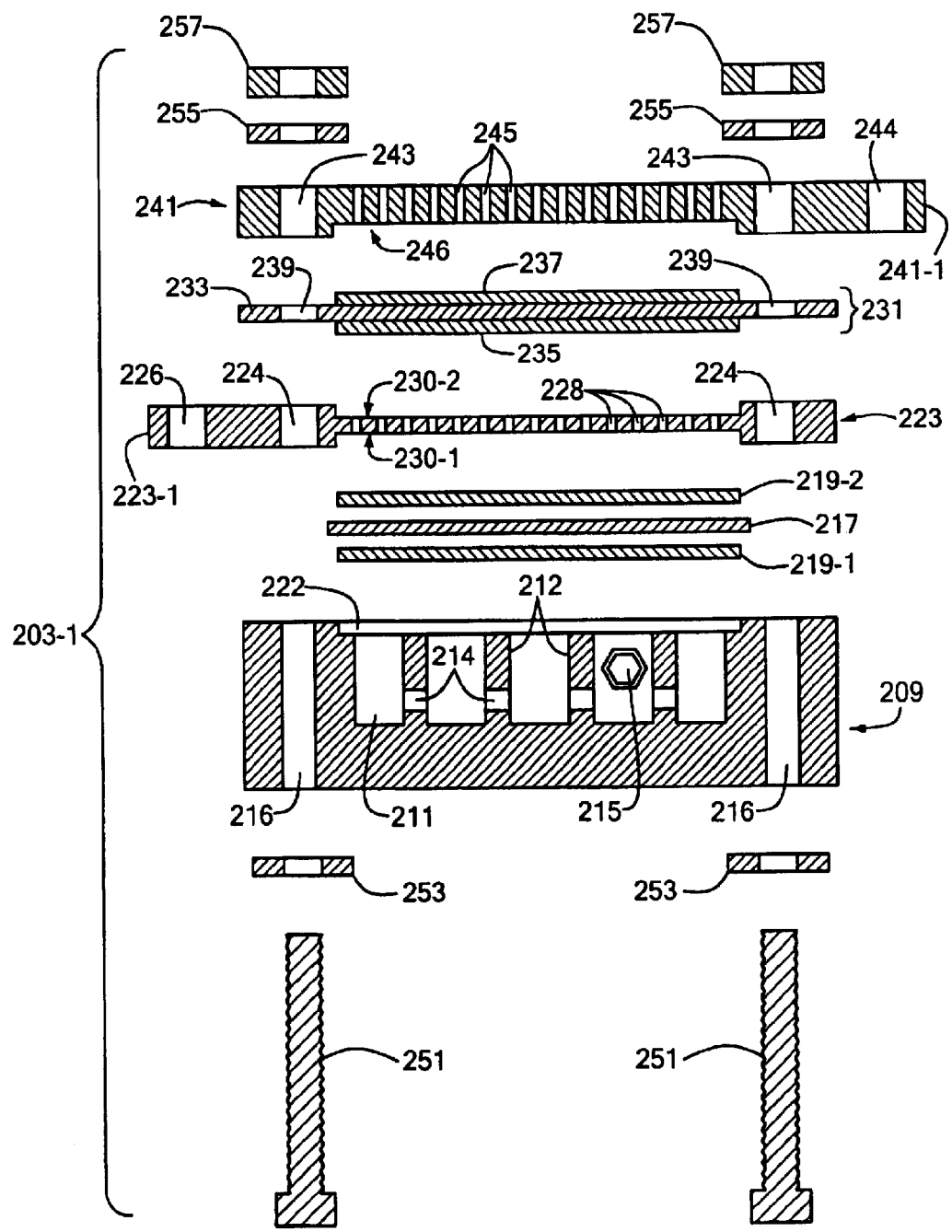
FIG. 4(b) is an exploded section view of one of the two co-planar direct organic fuel cells of the assembly shown in FIG. 4(a)
Figure 4C:
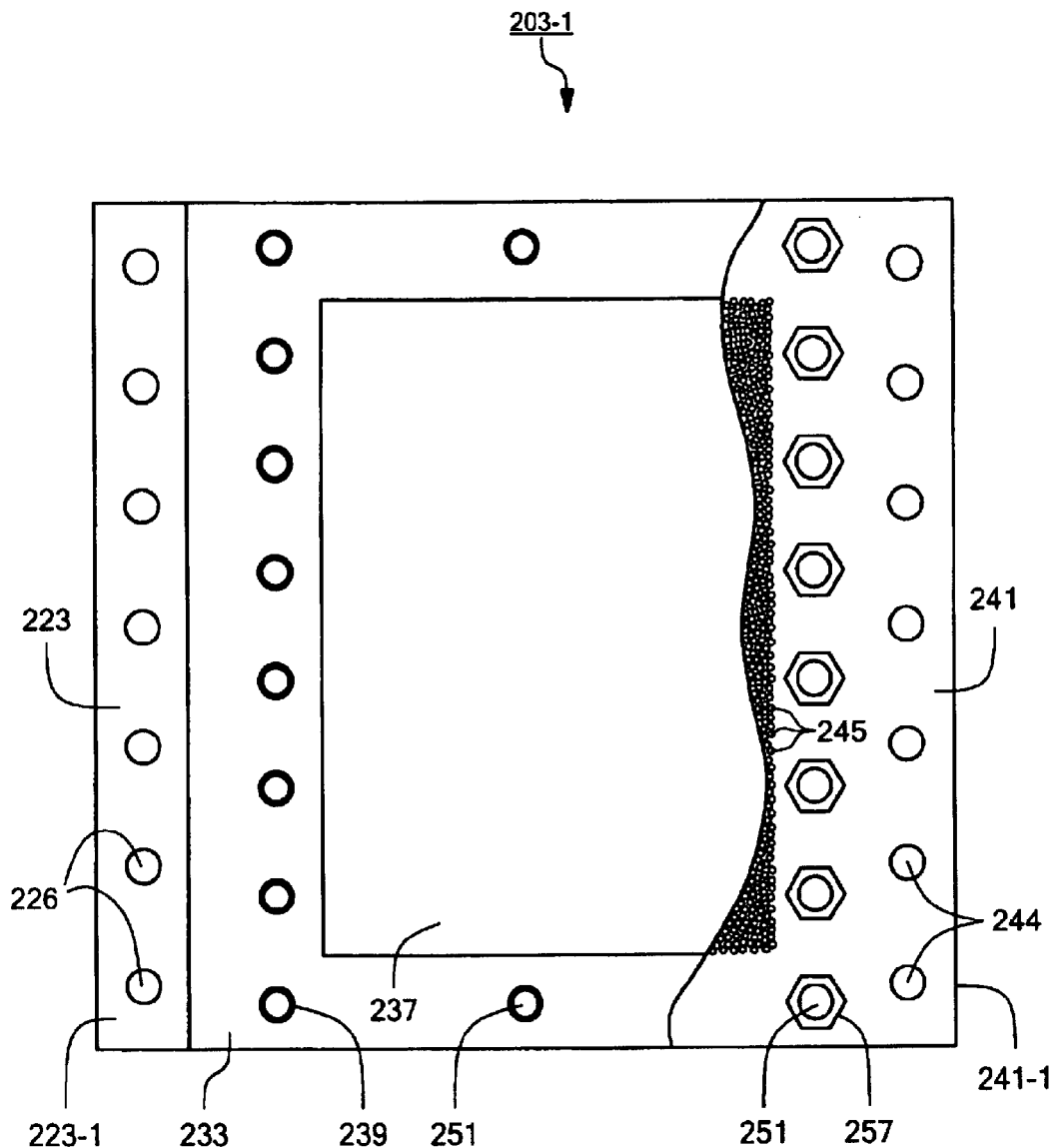
FIG. 4(c) is a top view, broken away in part, of the co-planar direct organic fuel cell shown in FIG. 4(b)

Assembly 201 comprises a pair of identical fuel cells 203-1 and 203-2. Referring now to FIGS. 4(b) and 4(c), there are shown an exploded section view and a top view, respectively, of fuel cell 203-1. As seen best in FIG. 4(b), fuel cell 203-1 comprises an anode basin 209, anode basin 209 defining an anode chamber 211 adapted to receive a quantity of liquid fuel through an input port 213 (see FIG. 4(a)). An output port 215 is also in fluid communication with anode chamber 211. (If desired, one can interconnect the anode chambers 211 of a plurality of cells 203 using ports 213 and 215.) A recessed shelf 222, the purpose of which will be described below, is formed along the top periphery of chamber 211. A plurality of supports 212, the purpose of which will become apparent below, are located in chamber 211 and extend upwardly to shelf 222, supports 212 being provided with transverse openings 214 to permit fluid flow therethrough. A plurality of transverse openings 216 are provided in anode basin 209 around the periphery of shelf 222, the purpose of openings 216 to be described below.

Cell 203-1 also comprises a vapor transport member 217, vapor transport member 217 being identical to vapor transport member 141 of fuel cell 101. Vapor transport member 217 is sandwiched between a pair of porous supports 219-1 and 219-2, each of which is identical to porous support 151. Vapor transport member 217 is seated flush on top of anode basin 209, with porous support 219-1 being seated on recessed shelf 222 in anode basin 209.

Cell 203-1 additionally comprises an anode current collector 223. Anode current collector 223, which serves the same purposes as electrically-conductive, vapor-permeable member 131 of fuel cell 101, is similar in many respects to member 131, the principal differences between the two structures being that collector 223 is provided with a plurality of transverse openings. A first plurality of these openings, namely openings 224, are appropriately disposed in collector 223 so as to be alignable with openings 216 for reasons to become apparent below. A second plurality of openings, namely, openings 226, are disposed along a side 223-1 of collector 223 that extends beyond the periphery of anode basin 209, the purpose of openings 226 to be described below. A third plurality of openings, namely, openings 228 are large in number and resemble the openings of a screen or mesh for vapor passage therethrough.

Cell 203-1 further comprises a membrane electrode assembly 231, membrane electrode assembly 231 comprising a proton exchange membrane 233 sandwiched between an anode 235 and a cathode 237. Membrane electrode assembly 231 is identical to membrane electrode assembly 102, except for the presence in membrane 233 of a plurality of peripherally-spaced, transverse openings 239 alignable with openings 224.

Collector 223 is shaped to include a pair of recessed areas 230-1 and 230-2 that are appropriately dimensioned to receive, in a flush manner, support 219-2 and anode 235, respectively.

Cell 203-1 additionally comprises a cathode current collector 241, cathode current collector 241 being provided with a plurality of transverse openings. A first plurality of transverse openings, namely, openings 243 are alignable with openings 239 for reasons to become apparent below. A second plurality of transverse openings, namely, openings 244 are disposed along a side 241-1 of collector 241 that extends beyond the periphery of anode basin 209, openings 244 being alignable with openings 226 of an adjacent cell 203 for reasons to become apparent below. A third plurality of openings, namely, openings 245 are large in number and resemble the openings of a screen or mesh for air passage therethrough. Collector 241 is preferably shaped to include a recessed area 246 that is appropriately dimensioned to receive, in a flush manner, cathode 237.

Cell 203-1 further comprises means for providing compression to the various cell components to seal the cell and to ensure electrical conductivity between the electrodes and current collectors, said means comprising, in the present embodiment, corresponding pluralities of screws 251, washers 253, washers 255 and nuts 257, each screw 251 being inserted through a washer 253, an opening 216, an opening 224, an opening 239, an opening 243, a washer 255 and a nut 257, respectively. As can readily be appreciated, alternative means for sealing the cell and for applying compression can also be used, such means including, for example, clamps, spring assemblies, gaskets, o-rings and epoxies.

Referring back to FIG. 4(a), assembly 201 further comprises means for interconnecting cells 203-1 and 203-2 in such a way as to provide sufficient axial compression between anode current collector 223 of one cell and cathode current collector 241 of an adjoining cell to ensure electrical contact therebetween. In the present embodiment, said interconnecting means comprises a plurality of threaded rod assemblies 261 (only one threaded rod assembly 261 being shown in FIG. 4(a)), each threaded rod assembly 261 comprising a threaded rod 263, a pair of washers 265-1 and 265-2, and a pair of nuts 267-1 and 267-2. Each rod 263 is inserted through a nut 267-1, a washer 265-1, an opening 244 in cathode current collector 241 of one cell 203, an opening 226 in anode current collector 223 of an adjacent cell, a washer 265-2 and a nut 267-2, respectively. It should be understood, however, that alternative means for interconnecting cells 203-1 and 203-2 so as to provide the aforementioned electrical contact may also be used, such alternative means including the use of clamps, spring assemblies, conductive epoxies and the like.

As can readily be appreciated, although assembly 201 has been shown comprising only a pair of fuel cells 203-1 and 203-2, assembly 201 could easily be modified to include any number of fuel cells 203.

One advantage of the design of assembly 201 is that the internal manifolding necessary to distribute the reactants along the length of a conventional fuel cell stack is eliminated. This, in turn, eliminates the need for forced convection to distribute the reactants to each cell, which is ideal for a passive or low-pressure delivery system. In addition, the sealing requirements for the present design are reduced; in fact, only one seal is required—around the periphery of the anode chamber. This simplifies the assembly of the fuel cell stack considerably and reduces the need for strength in the end plates and tie rods that are typically used to hold a conventional fuel cell stack together. Due primarily to the absence of typically heavy compressive endplate members, co-planar fuel cells are generally lighter and more compact than an equivalent bipolar stack for low power production. For applications requiring higher power, one or more vapor transport members can be integrated with one or more series-connected or parallel-connected cell strips, each of which contain multiple cells on the same strip of membrane.

Figure 5:
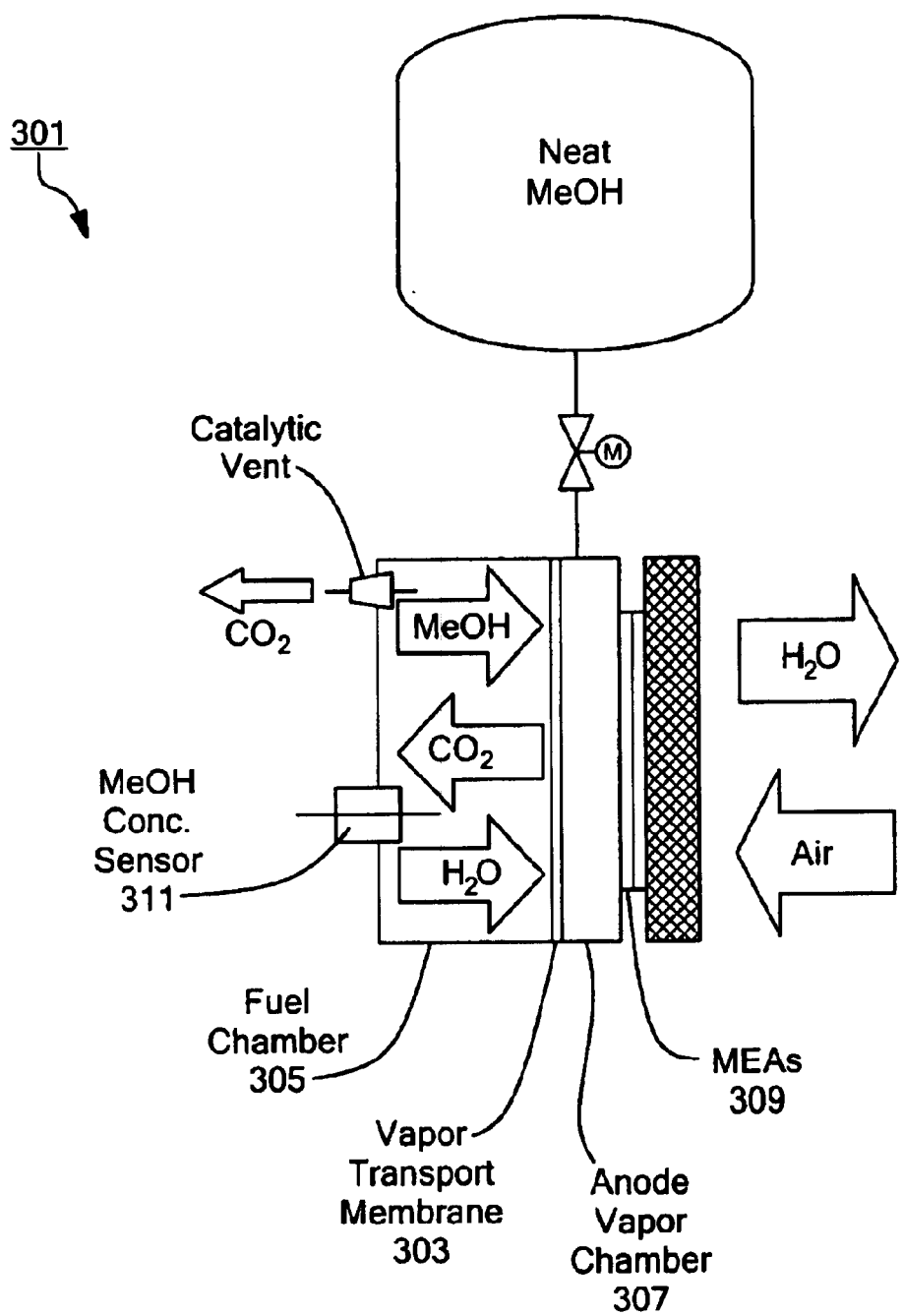
FIG. 5 is a schematic view of a fuel cell system constructed according to the teachings of the present invention, said fuel cell system including a plurality of co-planar direct organic fuel cells.

Referring now to FIG. 5, there is schematically shown one embodiment of a fuel cell system constructed according to the teachings of the present invention, said fuel cell system being represented generally by reference numeral 301.

As can be seen, in system 301, a vapor transport member 303 is used to controllably feed organic vapor and water vapor to the anodes of a coplanar fuel cell. An aqueous organic fuel solution is supplied to a fuel chamber 305 that is separated from the anode compartment 307 of the fuel cell by the vapor transport member 303. A vapor permeable current collector (not shown) is located between the vapor transport member 303 and the anode of the MEAs 309. A fuel concentration sensor 311 located in the fuel chamber 305 may be used to control the injection of liquid organic fuel and water into the fuel chamber 305.

As can readily be appreciated, system 301 is far less complicated than conventional system 51. In system 301, circulation of the methanol stream is eliminated. This does not have a significant impact on heat removal due to the reduced cooling requirements of a low-power, low-temperature cell. To achieve gravity insensitive operation, wicks or porous members may be used to provide the fuel solution to the fuel chamber. The open cathode design and use of wicking in the co-planar cell eliminates the requirements for a water-gas separator and a condenser on the cathode.

It should be understood that, although the preferred operation of the fuel cell of the present invention is to have liquid organic fuel contact the vapor transport member, the organic fuel contacting the vapor transport member could alternatively be in the vapor state or in a liquid/vapor state.

It should also be understood that the fuel cell of the present invention could alternatively be operated so that pure $H_2$ or a value-added organic product is generated at the cathode, instead of water. This may be done by electrochemically oxidizing the fuel at the anode to form protons, electrons and $CO_2$ and then by providing an electrical current to the electrochemical cell to pump the protons through the proton exchange membrane and the electrons through an external circuit to the cathode of the cell, where the protons are reduced in the absence of oxygen to form gaseous $H_2$ or, alternatively, are reacted with a reducible species to produce a hydrogen-containing species.

The following examples are provided for illustrative purposes only and are in no way intended to limit the scope of the present invention:

EXAMPLE 1

To demonstrate methanol vapor transport, the permeability of various concentrations of methanol across Nafion® 112 was determined by oxidizing the methanol that permeates across the membrane and measuring the resultant $CO_2$ concentration. In this method, a Pt electrode was bonded to one side of the membrane. The membrane was placed in a fixture with the bare side in contact with a liquid chamber. A methanol solution of the desired concentration and temperature was circulated through the liquid compartment. A known flow of air or oxygen was passed through the opposite compartment. Methanol permeating through the membrane reacted with the oxygen at the Pt electrode to form $CO_2$ and water. The effluent gas was dried to remove the water, then passed through an in-line infrared $CO_2$ monitor. The moles of $CO_2$ produced, and thus the moles of methanol reacted, were calculated from these measurements.

These measurements, listed in Table I below, show that methanol permeability across Nafion® 112 is very high even at room temperature. For a 50 wt % methanol solution, the methanol permeation rate is sufficient to support electrochemical oxidation of methanol at greater than 4000 mA/cm², much greater than the typical direct methanol fuel cell operating point of 100 to 200 mA/cm².

TABLE I

| | Units | 10 wt % | 25 wt % | 50 wt % |
|---|---|---|---|---|
| Methanol Permeation | mole $CH_3OH$-$min^{-1}$-$cm^{-2}$ ($\times 10^{-6}$) | 29.7 | 81.8 | 426.6 |
| | Equivalent Methanol Oxidation Rate (mA/cm²) | 286.6 | 789.2 | 4116.1 |
| | ml/hr for a 25 cm² area | 1.81 | 4.97 | 25.94 |
| | Temperature | 23° C. | 24° C. | 25° C. |

EXAMPLE 2

A single-cell direct methanol fuel cell incorporating a vapor transport member was assembled according to FIG. 3. The active area of the cell was 25 cm². The vapor transport member was Nafion® 105. A metal screen package consisting of several layers of expanded niobium, plated with Pt to minimize porous resistance, served as the porous current collector. The anode consisted of 4 mg/cm² Pt/Ru catalyst, bonded with Nafion® ionomer solution, supported on carbon fiber paper. The cathode contained 4 mg/cm² Pt black catalyst plus a Teflon binder, supported on wetproofed carbon fiber paper. The electrodes were bonded to Nafion® 117 membrane to form the membrane electrode assembly.

Figure 6:
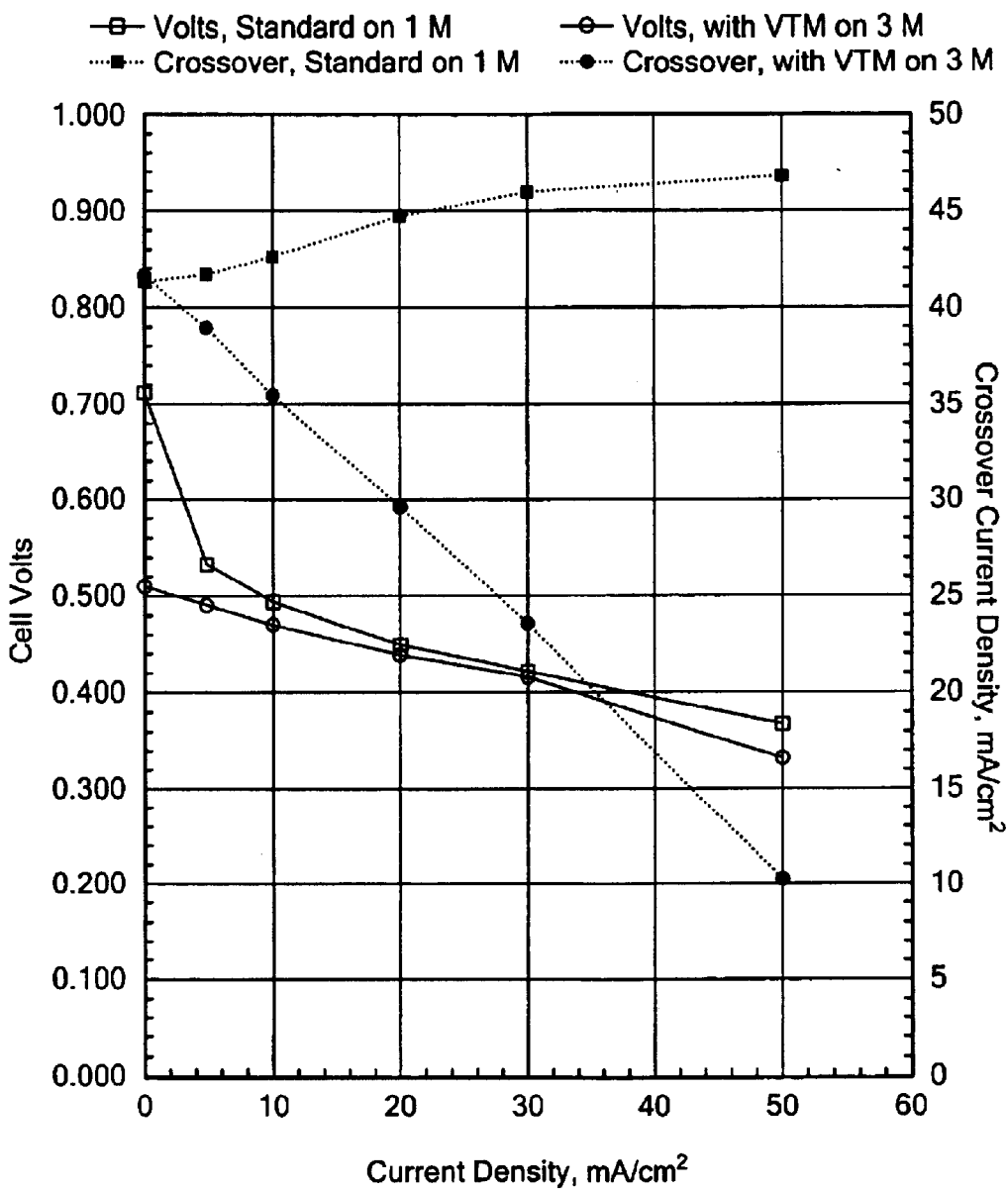
FIG. 6 is a graph comparing the 25° C. performance of a conventional direct methanol fuel cell with that of a direct methanol fuel cell of the present invention.

The direct methanol fuel cell was tested with an aqueous methanol solution flowing through the fuel compartment at 25 cc/min and air flowing through the cathode compartment at approximately 3 times the stoichiometric rate. Performance at 25° C. of the fuel cell incorporating the vapor transport member with 3 M methanol flowing through the fuel compartment is comparable to that of the standard direct methanol fuel cell operating on 1 M methanol, as shown in FIG. 6. This figure also shows that the methanol cross-over rate of the cell incorporating the vapor transport member is significantly lower than that of the standard liquid feed direct methanol fuel cell. At an operating current density of 50 mA/cm², the methanol cross-over of the cell incorporating the vapor transport member is 21 percent that of the standard direct methanol fuel cell.

Figure 7:
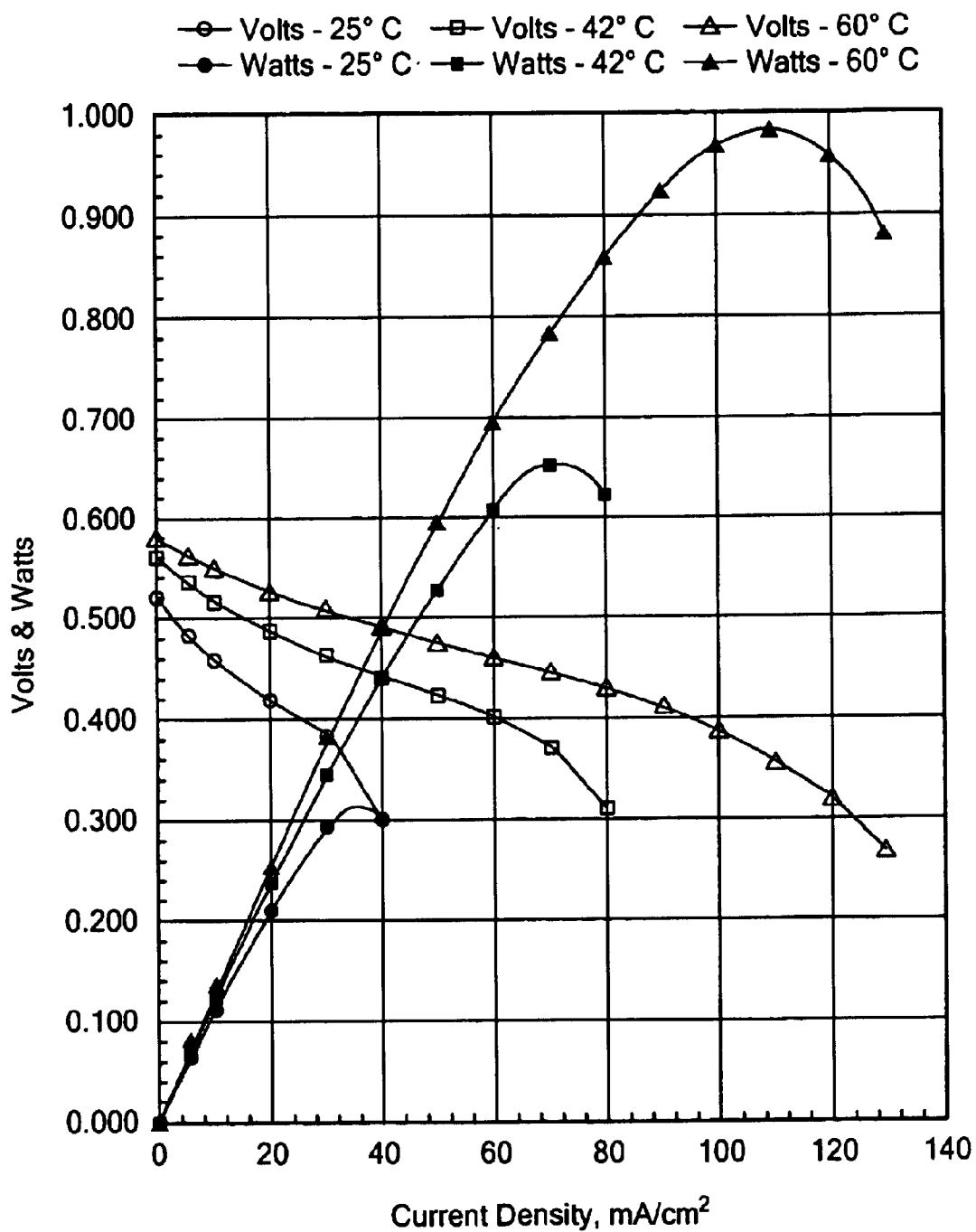
FIG. 7 is a graph illustrating the effect of temperature on the performance of a direct methanol fuel cell of the present invention.

The effect of increasing temperature on performance of the direct methanol fuel cell incorporating the vapor transport member is shown in FIG. 7. The cell voltage at a given current density increases with increasing temperature, and the attainable current density increases with increasing temperature. At 60° C. with 3 M methanol solution, cell performance was 0.388V at 100 mA/cm².

Figure 8:
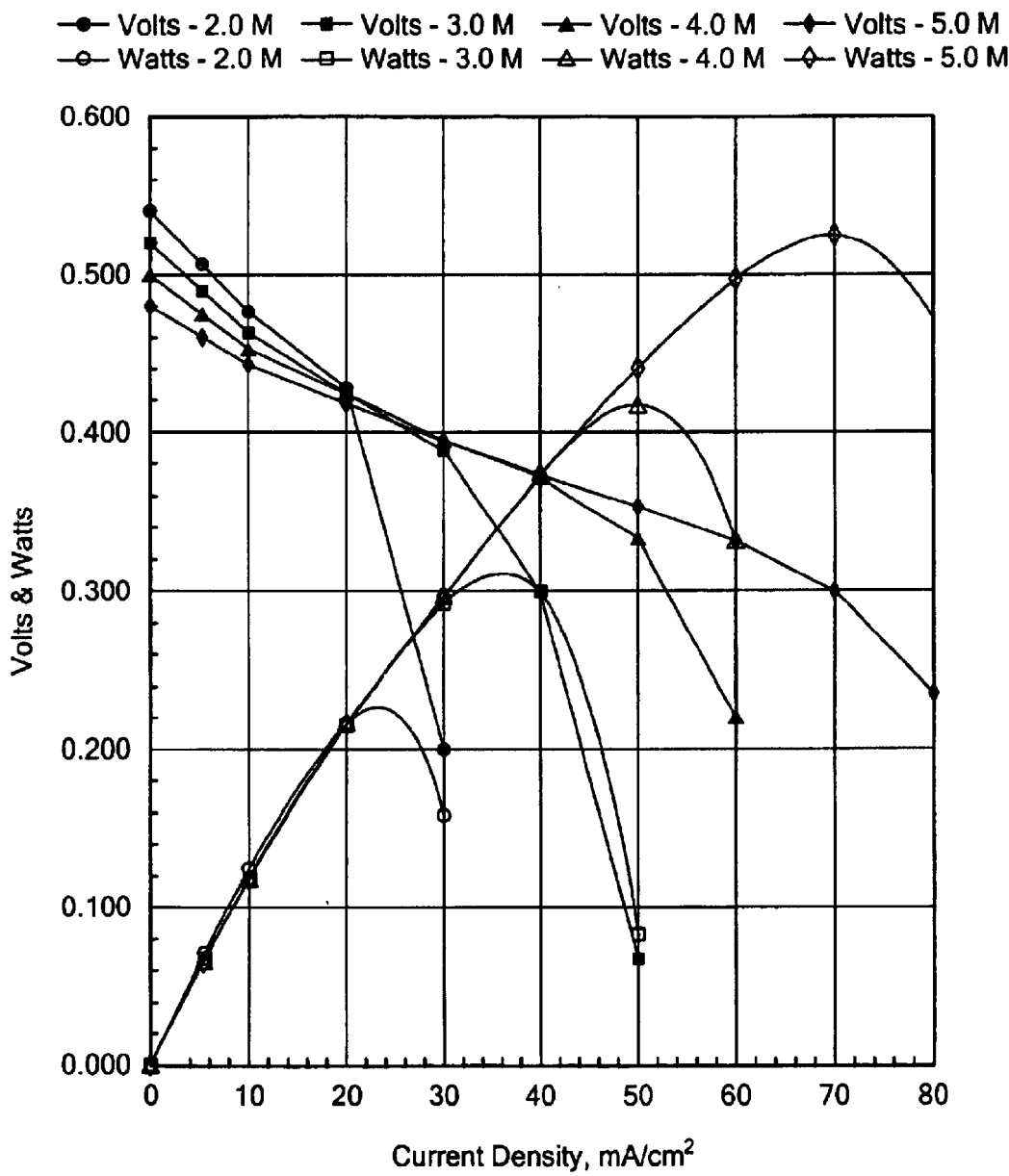
FIG. 8 is a graph illustrating the effect of methanol concentration on the performance of a direct methanol fuel cell of the present invention.

The effect of increasing methanol concentration on fuel cell performance is shown in FIG. 8. In contrast to standard liquid feed direct methanol fuel cells, in which fuel cell performance decreases as the methanol concentration is increased above 1 M due to an increased amount of methanol on the cathode, the performance of the cell with the vapor transport member increases with increasing methanol concentration, at least up to 5 M. Improved performance at higher concentrations is due to: (1) higher concentrations of methanol at the anode, increasing the limiting current density and (2) reduced cross-over of methanol to the cathode compared to liquid feed, minimizing cathode performance losses due to the parasitic methanol/air reaction, as well as excessive wetting of the air cathode structure by methanol.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A fuel cell comprising:
   (a) a membrane electrode assembly, said membrane electrode assembly comprising
       (i) a proton exchange membrane, said proton exchange membrane having a front face and a rear face,
       (ii) an anode, said anode coupled to said front face of said proton exchange membrane, and
       (iii) a cathode, said cathode coupled to said rear face of said proton exchange membrane;
   (b) a vapor diffusion chamber, said vapor diffusion chamber being positioned in front of said anode;
   (c) a vapor transport member positioned in front of said vapor diffusion chamber, said vapor transport member being substantially impermeable to an organic fuel and water mixture in a liquid phase but being permeable to said organic fuel and water mixture in a vapor phase; and
   (d) means for electrically interconnecting said anode and said cathode through an external load.

2. The fuel cell as claimed in claim 1 wherein said vapor transport member is a pervaporation membrane.

3. The fuel cell as claimed in claim 1 wherein said vapor transport member is a permselective membrane.

4. The fuel cell as claimed in claim 1 wherein said vapor transport member is an ionomeric membrane.

5. The fuel cell as claimed in claim 4 wherein said vapor transport member is an anion-exchange membrane.

6. The fuel cell as claimed in claim 4 wherein said vapor transport member is a cation-exchange membrane.

7. The fuel cell as claimed in claim 6 wherein said vapor transport membrane is a perfluorosulfonic acid membrane.

8. The fuel cell as claimed in claim 1 wherein said vapor transport member is a porous separator or diaphragm material containing a ceramic material.

9. The fuel cell as claimed in claim 1 wherein said vapor transport member is electrically-conductive.

10. The fuel cell as claimed in claim 1 further comprising an electrically-conductive, vapor-permeable member positioned between said vapor transport member and said anode, said electrically-conductive, vapor-permeable member defining said vapor diffusion chamber.

11. The fuel cell as claimed in claim 10 wherein said vapor transport member is electrically-conductive and wherein said electrically-conductive, vapor-permeable member is in contact with each of said vapor transport member and said anode.

12. The fuel cell as claimed in claim 10 wherein said electrically-conductive, vapor-permeable member is selected from the group consisting of a metallic screen package; a porous metal or carbon foam, paper or felt; and a perforated metal or carbon plate.

13. The fuel cell as claimed in claim 1 wherein said anode comprises an anodic electrocatalytic film positioned at its interface with said proton exchange membrane and wherein said cathode comprises a cathodic electrocatalytic film positioned at its interface with said proton exchange membrane, said anodic electrocatalytic film comprising an oxidation electrocatalyst selected from the group consisting of (i) the combination of platinum and one or more metals from Groups IIIA, IVA, VA, IB, IIB, IIIB, IVB, VB, VIB, VIIB, and VIIIB of the periodic table; (ii) metal oxides of said combination including reduced metal oxides of said combination; and (iii) mixtures and/or alloys thereof, said cathodic electrocatalytic film comprising a reduction electrocatalyst selected from the group consisting of (i) platinum; (ii) metal oxides of platinum, including reduced metal oxides of platinum; and (iii) mixtures and/or alloys thereof.

14. The fuel cell as claimed in claim 13 wherein said anodic electrocatalytic film further comprises an electrically-conductive support upon which said oxidation electrocatalyst is supported.

15. The fuel cell as claimed in claim 13 wherein said cathodic electrocatalytic film further comprises an electrically-conductive support upon which said reduction electrocatalyst is supported.

16. The fuel cell as claimed in claim 13 wherein said oxidation electrocatalyst comprises platinum and ruthenium.

17. A plurality of electrically-connected fuel cells, each of said plurality of electrically-connected fuel cells being a fuel cell as claimed in claim 1.

18. The plurality of electrically-connected fuel cells as claimed in claim 17 wherein said plurality of electrically-connected fuel cells are connected in parallel.

19. The plurality of electrically-connected fuel cells as claimed in claim 17 wherein said plurality of electrically-connected fuel cells are connected in series.

20. The plurality of electrically-connected fuel cells as claimed in claim 11 wherein said plurality of electrically-connected fuel cells are connected in series in a bipolar stack configuration.

21. A fuel cell comprising:
   (a) a membrane electrode assembly, said membrane electrode assembly comprising
       (i) a proton exchange membrane, said proton exchange membrane having a front face and a rear face,
       (ii) an anode, said anode coupled to said front face of said proton exchange membrane, and
       (iii) a cathode, said cathode coupled to said rear face of said proton exchange membrane;
   (b) an electrically-conductive, vapor-permeable member, said electrically-conductive, vapor-permeable member being positioned in front of and in contact with said anode and defining a vapor diffusion chamber,
   (c) a vapor transport member positioned in front of said electrically-conductive, vapor-permeable member, said vapor transport member being substantially impermeable to an organic fuel and water mixture in a liquid phase but being permeable to said organic fuel and water mixture in a vapor phase;
   (d) a first plate, said first plate positioned in front of said vapor transport member and having a cavity facing towards said vapor transport member, said cavity being adapted to hold a quantity of a liquid fuel;
   (e) a second plate, said second plate being positioned behind said membrane electrode assembly and having a cavity facing said cathode, said cavity being adapted to hold a quantity of an oxidant; and
   (f) a positive terminal positioned behind said second plate, said positive terminal being electrically coupled through an external load to said electrically-conductive, vapor-permeable member.

22. The fuel cell as claimed in claim 21 wherein said positive terminal is a first endplate, said fuel cell further comprising a second endplate, said first and second endplates being adapted to apply axially compressive force to said second and first plates, respectively.

23. The fuel cell as claimed in claim 21 wherein said vapor transport member is a perfluorosulfonic acid membrane.

24. The fuel cell as claimed in claim 21 wherein said vapor transport member is electrically-conductive.

25. The fuel cell as claimed in claim 21 further comprising a porous support positioned between and in contact with each of said first plate and said vapor transport membrane.

26. A co-planar fuel cell assembly comprising:
(a) a plurality of coplanar fuel cells, each of said co-planar fuel cells comprising
  (i) a membrane electrode assembly, said membrane electrode assembly comprising:
    (A) a proton exchange membrane, said proton exchange membrane having a top face and a bottom face,
    (B) an anode, said anode coupled to said bottom face of said proton exchange membrane, and
    (C) a cathode, said cathode coupled to said top face of said proton exchange membrane;
  (ii) an anode current collector, said anode current collector being electrically-conductive and vapor-permeable, said anode current collector being positioned below and in contact with said anode and defining a vapor diffusion chamber;
  (iii) a vapor transport member positioned below said anode current collector, said vapor transport member being substantially impermeable to an organic fuel and water mixture in a liquid phase but being permeable to said organic fuel and water mixture in a vapor phase;
  (iv) an anode basin, said anode basin being positioned below said vapor transport member and having a cavity facing towards said vapor transport member, said cavity being adapted to hold a quantity of a liquid fuel;
  (v) a cathode current collector positioned over said cathode, said cathode current collector being electrically coupled to said anode current collector; and
(b) means for coupling together said co-planar fuel cells.

27. The co-planar fuel cell assembly as claimed in claim 26 wherein at least some of said co-planar fuel cells are connected in series.

28. The co-planar fuel cell assembly as claimed in claim 26 wherein at least some of said co-planar fuel cells are connected in parallel.

29. A method of generating an electrical current, said method comprising the steps of:
(a) providing the fuel cell of claim 1;
(b) delivering a liquid mixture of an organic fuel and water to said vapor transport membrane; and
(c) delivering gaseous oxygen to said cathode.

30. The method as claimed in claim 29 wherein said organic fuel is selected from the group consisting of methanol, ethanol, propanol, isopropanol, trimethoxymethane, dimethoxymethane, dimethyl ether, trioxane, formaldehyde, and formic acid.

31. The method as claimed in claim 29 wherein said organic fuel is methanol.

32. A method of generating gaseous hydrogen, said method comprising the steps of:
(a) providing the fuel cell of claim 1;
(b) delivering a liquid mixture of an organic fuel and water to said vapor transport membrane; and
(c) supplying electricity to the fuel cell;
(d) whereby gaseous hydrogen is generated at said cathode.

33. The method as claimed in claim 32 wherein said organic fuel is selected from the group consisting of methanol, ethanol, propanol, isopropanol, trimethoxymethane, dimethoxymethane, dimethyl ether, trioxane, formaldehyde, and formic acid.

34. The method as claimed in claim 32 wherein said organic fuel is methanol.

35. A method of generating a hydrogen-containing species, said method comprising the steps of:
(a) providing the fuel cell of claim 1;
(b) delivering a liquid mixture of an organic fuel and water to said vapor transport membrane; and
(c) delivering to said cathode a reducible species;
(d) whereby said reducible species is reduced at said cathode to produce a hydrogen-containing species.

36. The method in claim 35 wherein said organic fiel is selected from the group consisting of methanol, ethanol, propanol, isopropanol, trimethoxymethane, dimethoxymethane, dimethyl ether, trioxane, formaldehyde, and formic acid.

37. The method in claim 35 wherein said organic fuel is methanol.

* * * * *